United States Patent [19]
Dunham et al.

[11] Patent Number: 5,961,006
[45] Date of Patent: Oct. 5, 1999

[54] PUMP ASSEMBLY FOR USE WITH VOLUMETRIC CONTAINER

[76] Inventors: Ernest Dunham, 151 E. Albanus St., Philadelphia, Pa. 19120; Maureen Arthur, 1419 W. Seventh St., Chester, Pa. 19013

[21] Appl. No.: 08/899,527

[22] Filed: Jul. 24, 1997

[51] Int. Cl.[6] .................................................. B67D 5/40
[52] U.S. Cl. ...................... 222/383.1; 222/385; 222/529; 222/530
[58] Field of Search .................................. 222/527, 529, 222/530, 189.07, 401, 385, 383.1; 15/264; 210/532.1; 109/33

[56] References Cited

U.S. PATENT DOCUMENTS

| | | | |
|---|---|---|---|
| 356,852 | 2/1887 | Robinson . | |
| 528,563 | 11/1894 | Poufe et al. | 222/385 |
| 550,279 | 11/1895 | Locker et al. | 222/401 |
| 583,471 | 6/1897 | Harrison | 169/33 |
| 706,971 | 8/1902 | Logan . | |
| 790,719 | 5/1905 | Bullock | 222/385 |
| 868,426 | 10/1907 | Goodchild | 222/401 |
| 876,917 | 1/1908 | Sieben | 169/33 |
| 1,157,475 | 10/1915 | Webster . | |
| 1,236,156 | 8/1917 | Finnell . | |
| 2,053,533 | 9/1936 | Rizor | 222/530 |
| 2,712,668 | 7/1955 | Thiele | 15/264 |
| 3,047,195 | 7/1962 | Richmond | 222/189.07 |
| 3,134,577 | 5/1964 | Bollmeier | 259/71 |
| 3,216,573 | 11/1965 | Irion | 210/532.1 |
| 4,650,100 | 3/1987 | Echazabal, Jr. | 222/530 |
| 4,798,307 | 1/1989 | Evrard | 220/20.5 |
| 5,183,280 | 2/1993 | Gresch | 280/79.5 |
| 5,379,862 | 1/1995 | Schmidt et al. | 184/106 |
| 5,460,264 | 10/1995 | Rupert | 206/217 |
| 5,472,124 | 12/1995 | Martushev | 222/530 |
| 5,597,097 | 1/1997 | Morris | 222/529 |

FOREIGN PATENT DOCUMENTS 201280  8/1923  United Kingdom ................. 222/385

*Primary Examiner*—Philippi Derakshani
*Attorney, Agent, or Firm*—Volpe and Koenig, P.C.

[57] ABSTRACT

A pump assembly for use with an open end volumetric container having at least a vertical portion which defines a height of the volumetric container. The pump assembly includes a substantially hollow body portion having first and second ends. A plunger member extends slidably through the first end. An inlet valve is adjacent to the second end and opens into the body. An outlet valve opening out from the body is also provided. The assembly also includes an assembly for mounting the pump assembly on the container vertical portion with the body second end positioned within the volumetric container.

16 Claims, 4 Drawing Sheets

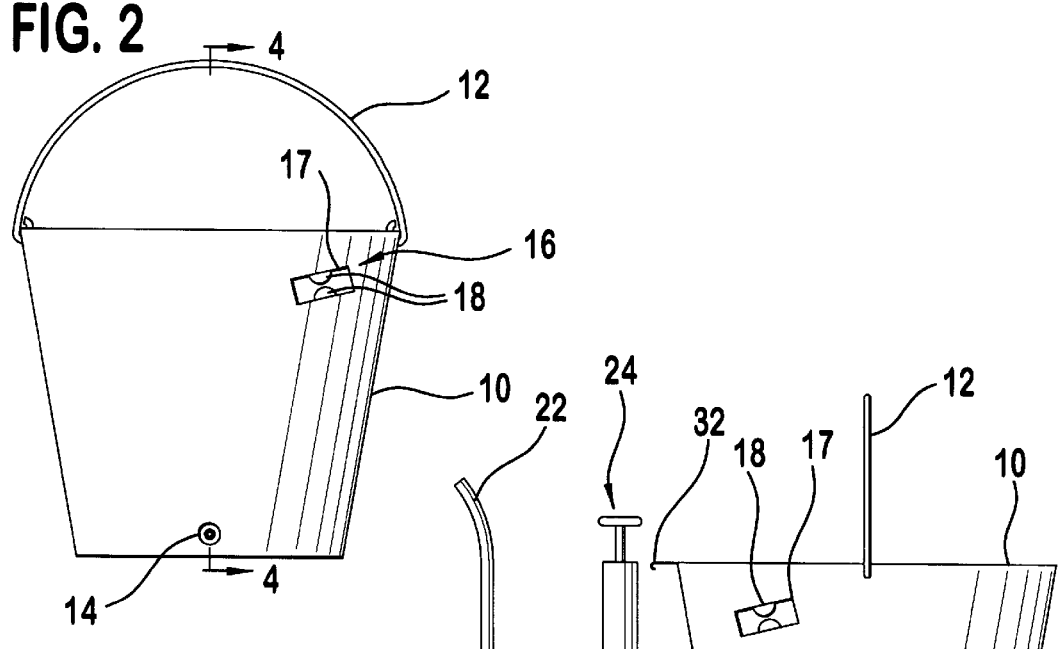
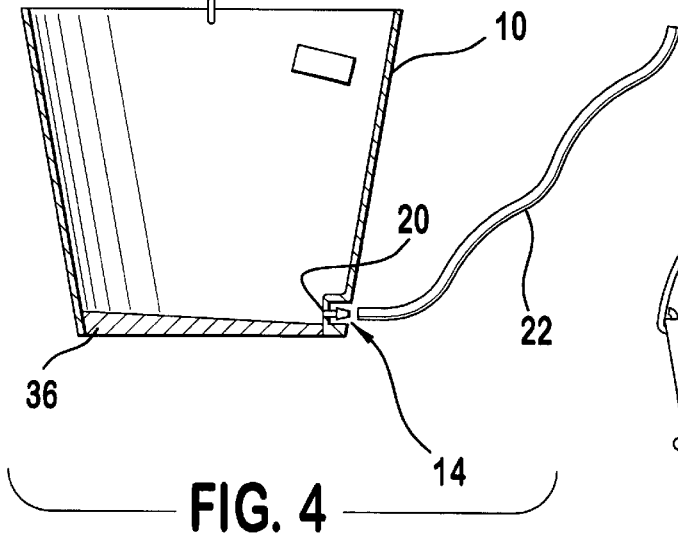
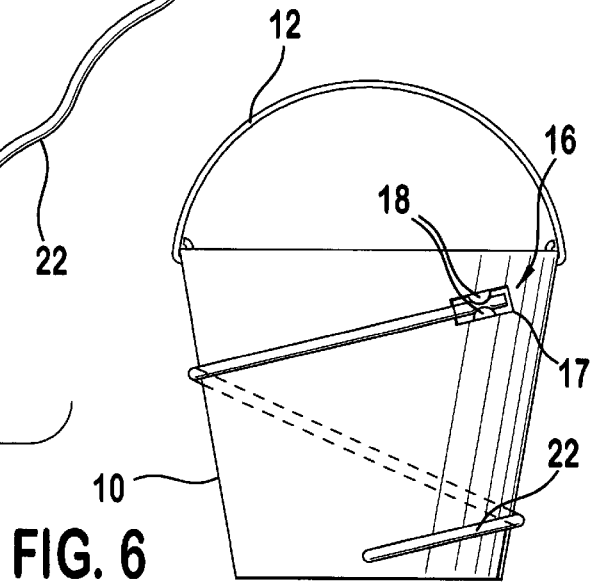

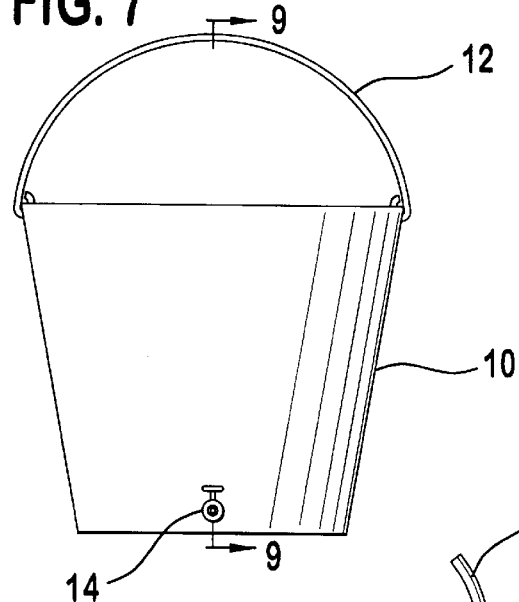
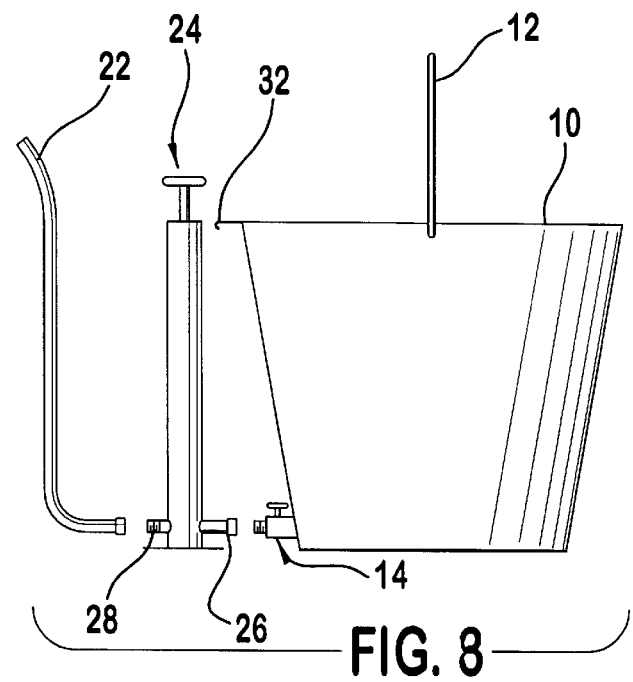
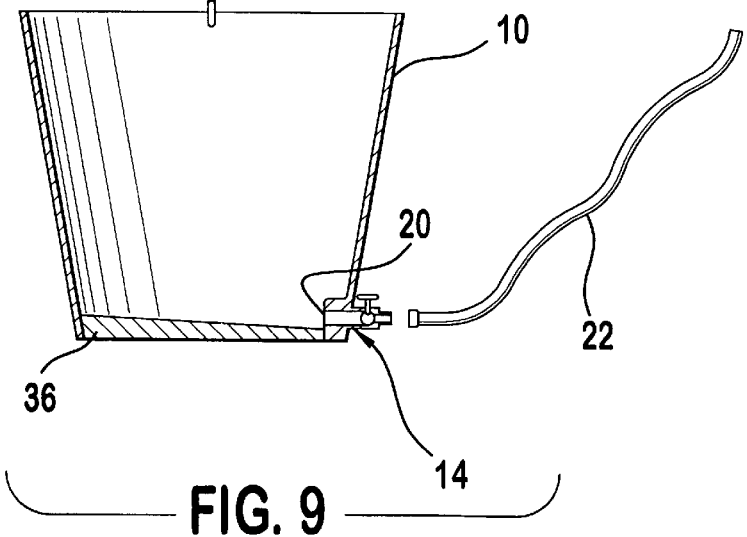

PUMP ASSEMBLY FOR USE WITH VOLUMETRIC CONTAINER

BACKGROUND OF THE INVENTION

1. Field of the Invention

The present invention generally relates to a utility bucket. More particularly, the invention relates to a utility bucket having a drain spout incorporated therein.

2. Description of the Prior Art

In the cleaning industry, a utility cart similar to that shown in FIG. 1 is often utilized. Such a cart usually has a utility bucket platform that can be up to thirteen inches off the floor. A five gallon bucket placed on the platform can weigh in excess of forty-five pounds when filled with water.

Filling the bucket is generally not a problem, as a hose can be connected to the faucet and run into the bucket while it is on the cart. The problem generally arises when the bucket is to be emptied. Whether the bucket is to be emptied into a floor drain or a slop sink, the filled bucket must generally be lifted from the cart to be emptied. While some prior art buckets have been designed with a plug the user can remove to empty the bucket into a floor drain, these designs are often not practical. First, the drains are usually in a small broom closet. As such, the size of the cart, the configuration of the room or clutter in the room often make it difficult to closely align the outlet with the drain. Also, even if the cart can be maneuvered to such a position, there is often insufficient room for the user to gain access to the plug. In these instances, the plug is virtually useless as the user must leave the cart out of the room and carry the bucket to the drain anyway.

Additionally, even if the bucket can be positioned properly, other problems arise. In many carts, the bucket platform is only five inches off the ground while the walls of the drain stall are six to eight inches in height. A spout at the bottom of the bucket is below the wall and is therefore useless. Furthermore, if the bucket is at a sufficient height, simply removing a plug allows the bucket contents to flow in an uncontrolled manner, generally splashing as it hits the drain surface. This is a greater problem when the contents of the bucket are caustic.

To empty the bucket in a simple, controlled manner in situations like the above, it is necessary for the user to bend and lift the bucket off the cart and position it near the drain. This problem is often enhanced by the fact that most carts have a shelf or handle over the bucket. In order to lift the bucket, the user must not only bend, but must also reach under the obstruction in an awkward position as the bucket is lifted. In instances when a floor drain is not available, the user must further lift the bucket to a slop sink which may be thirty-six inches above the ground. The repeated lifting, particularly in an awkward position, causes great strain and pain to the user's back.

Accordingly, it is desirable to provide a bucket which allows the user to avoid lifting of a filled bucket.

SUMMARY OF THE INVENTION

The present invention provides a multi-purpose bucket assembly. The bucket has a drain member, positioned toward the bottom of the bucket, which has an inlet that opens into the bucket and an outlet that opens out from the bucket. A hose can be connected to the drain outlet to direct water from the bucket to a drain. A pump also may be included to assist the discharge of water.

BRIEF DESCRIPTION OF THE DRAWINGS

FIG. 2 is an elevation of a first embodiment of the present invention.

FIG. 3 is a second elevation of the utility bucket shown in FIG. 2 turned 90°.

FIG. 4 is a section view taken along the line 4—4 in FIG. 2.

FIG. 6 is an elevation of the utility bucket shown in FIG. 2 with a hose attached thereto.

FIG. 7 is an elevation of an alternate embodiment of the present invention.

FIG. 8 is a second elevation of the utility bucket shown in FIG. 7 turned 90°.

FIG. 9 is a section view taken along the line 9—9 in FIG. 7.

DESCRIPTION OF THE PREFERRED EMBODIMENT

The preferred embodiments will be described with reference to drawing figures wherein like numerals represent like elements throughout.

Figure 1:
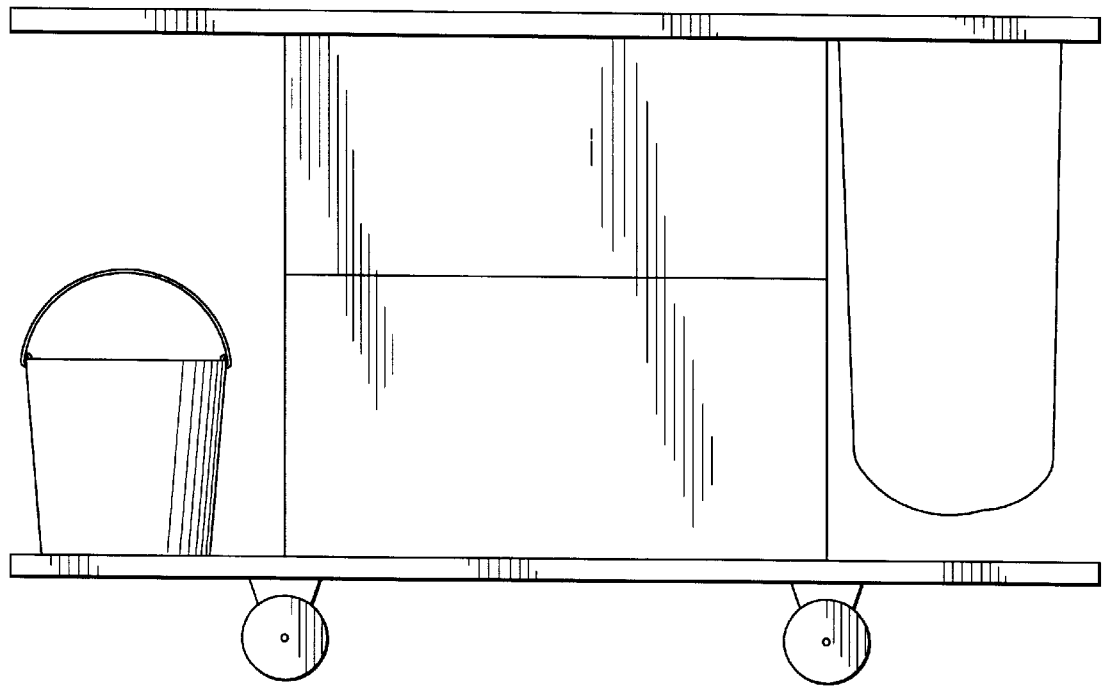
FIG. 1 is a side elevation of a utility cart with which the present invention may be used.
Figure 5:
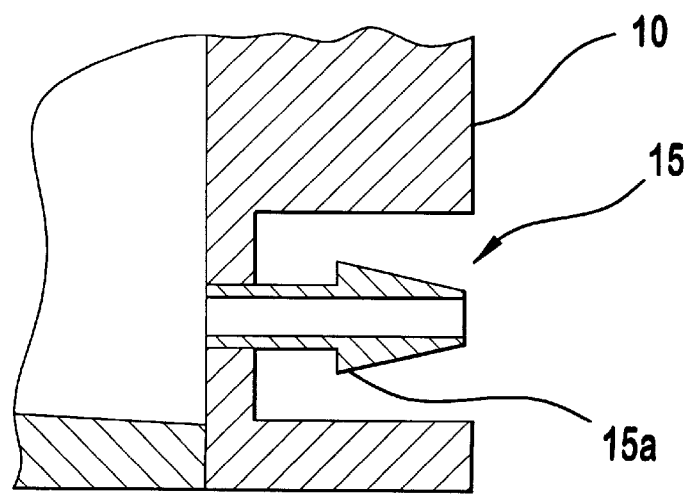
FIG. 5 is a cross section of the preferred nipple.

A first embodiment of the present invention is shown in FIGS. 2–6. The invention generally comprises a bucket 10 having a handle 12 and a spout 14. Preferably, the spout 14 is molded integral at a lower most point on the side wall of the bucket 10. As shown in FIG. 4, the spout consists of a nipple formed integral with the side wall. A preferred embodiment of the nipple 15 is shown in FIG. 5. As can be seen, the nipple 15 has a flange 15a which "bites" into the hose 22 when it is attached to prevent inadvertent detachment of the hose 22. Additionally, the hose 22 may be provided with a connector which fits on the spout 14. If the hose 22 is not used, a cap (not shown) may be placed on the spout 14.

The bucket 10 is provided with retaining means 16 which acts to hold the hose 22 and stop the flow of water from the hose 22. The retaining means 16 generally consists of a channel 17 with opposed projections 18 disposed there along. The retaining means 16 may be positioned anywhere and in any orientation on the bucket, but is preferably positioned as shown in FIG. 6 to allow the hose 22 to be wrapped around the bucket 10 and then terminated in the retaining means 16. Preferably, retaining means 16 is positioned above the normal water level to reduce any possible siphon effect. The retaining means 16 may also be positioned to facilitate easier access to the free end of the hose 22 in tight confines. When the hose is in the channel 17, the opposing projections 18 of the preferred retaining means 16 grip the hose 22 to hold it and stop the flow of water. This configuration is suitable for use with a floor drain, as the drain is below the spout 14 and the water will freely flow there towards. If the drain stall walls are higher than the height of the spout 14, the hose 22 can be fed over the wall and flow will still occur until the water level in the bucket 10 is equal to the highest point of the hose. However, at this point, there will be little water left in the bucket 10.

In those instances where it may be necessary to empty the bucket into a slop sink, a pump 24 is provided, as shown in FIG. 3. The pump 24 has an inlet valve 26 with a coupling member configured to couple the pump 24 with the spout 14. The pump 24 also has a spout 28 configured to receive the hose 22. When the pump 24 is attached to the spout 14, the pump 24 may rest on the utility cart shelf or the connection may be sufficient to allow the pump to be suspended on the side of the bucket 10. A hook member 32 which attaches near the upper end of the pump 24 may be provided to stabilize the pump 24. Alternatively, the pump 24 may be formed integral with the bucket 10 or inlet valve 26 may have a nipple configuration similar to the spout 14 so the pump 24 can be placed in a convenient location and a hose run between it and the bucket 10.

To empty the bucket 10, the plunger is withdrawn whereby water enters the pump through inlet valve 26. The plunger is then compressed to expel the water through the outlet valve 28 and the hose 22 into a slop sink or floor drain. A screen 20 may be provided over inlet valve 26 to prevent debris from entering the pump 24. Additionally, to facilitate filling of the bucket, the opposite end of the hose 22 may also be provided with a threaded female component whereby the hose can be attached to a male faucet.

The bucket 10 may also be provided with an inclined bottom 36 which may be formed integral with the bucket or may be inserted into the bucket 10. The bottom 36 may be inclined toward the spout 14, as shown in FIG. 4, to promote flow there towards or may be inclined away from the spout 14, as shown in FIG. 9, to cause debris or particulate matter to move away from the spout 14.

An alternative embodiment of the present invention is shown in FIGS. 7–9. The bucket 10 is similar to that of the first embodiment, however, the spout 14 is provided with a rotary valve 15 to stop the flow of water. The spout 14 may also be provided with threads as shown in FIG. 8. The hose 22 and pump 24 fittings are configured to mate with the fittings of spout 14.

Figure 10:
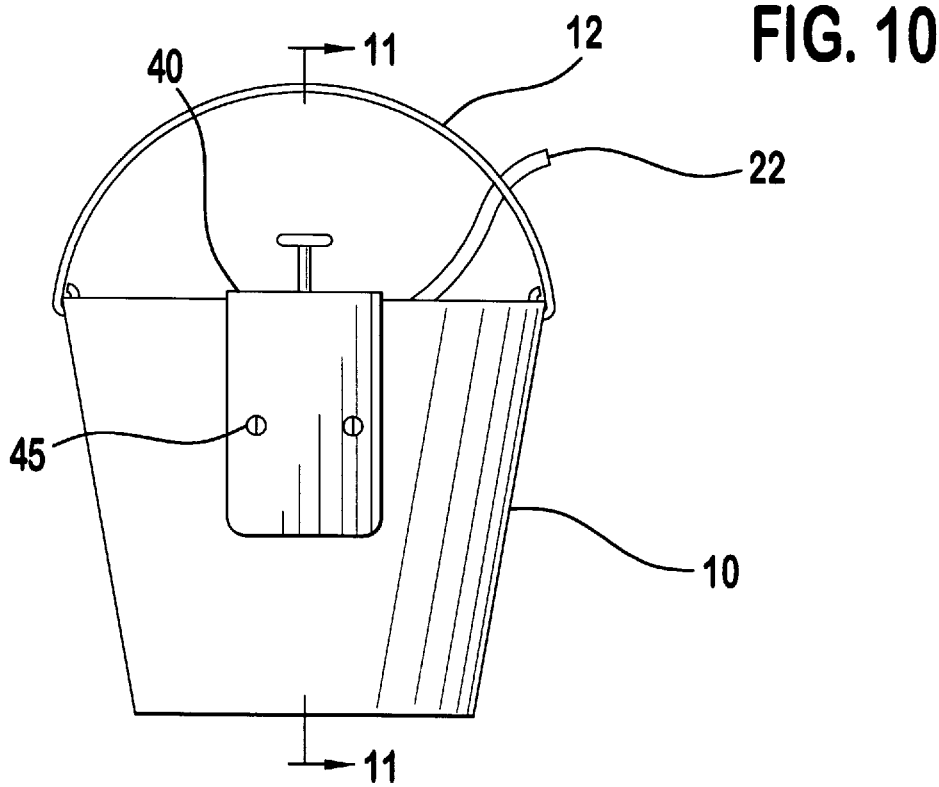
FIG. 10 is an elevation view of another alternate embodiment of the present invention.
Figure 11:
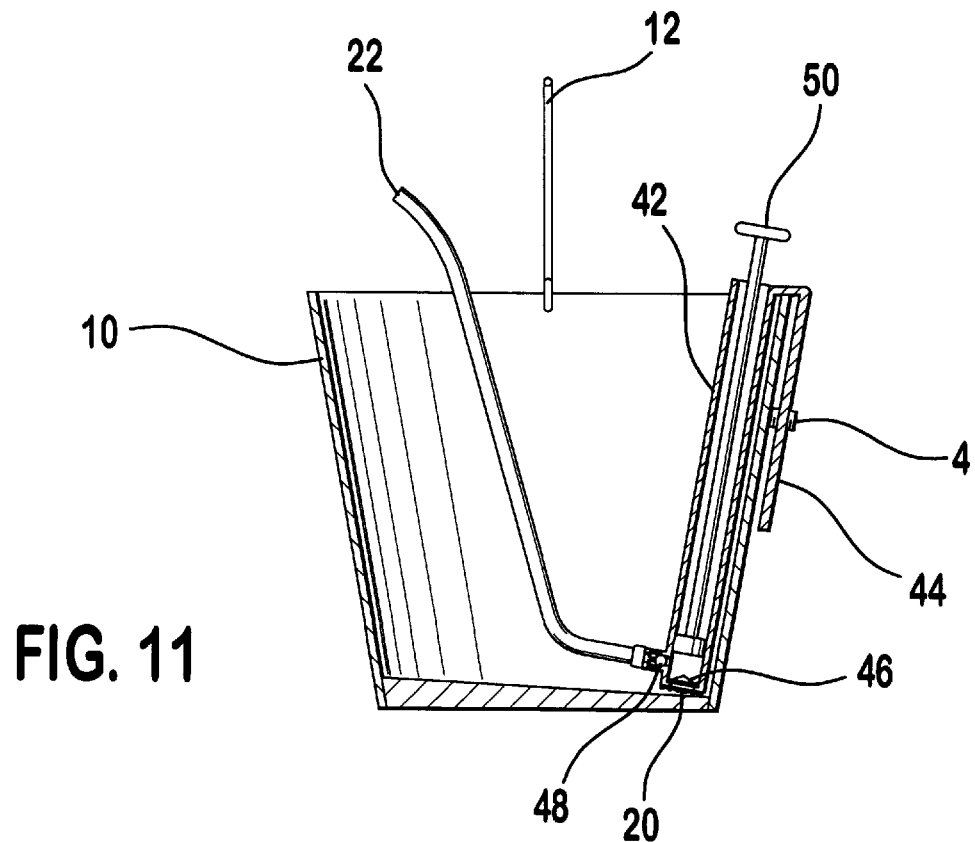
FIG. 11 is a section view taken along the line 11—11 in FIG. 10.

In another alternative embodiment, shown in FIGS. 10 and 11, the bucket 10 does not have a spout. Instead, the pump 40 is positioned in the bucket 10. Preferably, the pump 40 has an arm 44 which hangs over the side of the bucket 10 while the pump body 42 is positioned in the bucket 10. The preferred configuration of the pump body 42 and arm 44 is similar to that of a mop ringer which is used with a utility bucket. Preferably, set screws 45, which may be provided with washers to prevent puncturing of the bucket 10, are positioned on the arm 44 to hold the pump 40 in place. In an alternate embodiment, the arm 44 has a notch which engages the upper rim of the bucket 10 to hold the pump 40 in place. The pump body 42 has an inlet valve 46 and an outlet valve 48. The valves 46, 48 are preferably positioned adjacent the lower end of the pump body 42, however, the outlet valve 48 may be positioned higher such that the liquid can be pumped directly therefrom. In the preferred embodiment, a hose 22 is attached to the outlet valve 48 to direct the fluid out of the bucket 10. A screen 20 may be placed over the inlet valve 46 to prevent debris from entering the pump body 42. To empty the bucket, the plunger 50 is withdrawn to suck water into the pump body 42 and then depressed to expel the water out through the outlet valve 48 and hose 22 to a drain. The bucket 10 may also be provided with an inclined bottom 36 in either orientation as described above.

It will be understood that the hose 22 in the above embodiments may be a tube manufactured from any suitable flexible or semi-flexible material, including but not limited to, rubbers, plastics, composites or metals.

While the present invention has been described in terms of the preferred embodiments, other variations which are within the scope of the invention as outlined in the claims will be apparent to those skilled in the art.

We claim:

1. A multi-purpose bucket assembly comprising:
   a bucket having a hollow vertical portion that is closed at one end by a floor and is open at its other end;
   a drain member positioned in the vertical portion, the drain member having an inlet portion that opens into the bucket and an outlet portion that opens out from the bucket;
   a drain hose having first and second ends; and
   a pump member having an inlet valve which is operatively connected to the drain outlet and an outlet valve which is operatively connected to one end of the drain hose.

2. The bucket assembly of claim 1 wherein the pump member is formed integral with the bucket.

3. The bucket assembly of claim 1 wherein the drain member includes a rotary valve for controlling water flow.

4. The bucket assembly of claim 1 wherein the drain member outlet includes a nipple formed integral with the bucket vertical portion.

5. The bucket assembly of claim 1 wherein the drain member outlet is threaded.

6. The bucket assembly of claim 1 wherein the floor slopes toward the drain member.

7. The bucket assembly of claim 1 wherein the floor slopes away from the drain member.

8. The bucket assembly of claim 1 wherein a screen covers the inlet portion of the drain member.

9. The bucket assembly of claim 1 wherein a hose clamping means that is secured to the vertical portion and dimensioned to receive and close off the hose at a position between the ends thereof.

10. The bucket assembly of claim 9 wherein the hose clamping means includes a channel with opposing projections extending into the channel.

11. The bucket assembly of claim 9 wherein the drain member outlet includes a nipple formed integral with the bucket vertical portion.

12. The bucket assembly of claim 9 wherein the drain member outlet is threaded.

13. The bucket assembly of claim 9 wherein a pump member is operatively connected between the drain member outlet and the drain hose.

14. The bucket assembly of claim 9 wherein the floor slopes toward the drain member.

15. The bucket assembly of claim 9 wherein the floor slopes away from the drain member.

16. The bucket assembly of claim 9 wherein a screen covers the inlet portion of the drain member.

* * * * *